US005206514A

United States Patent [19]

Brandner et al.

[11] Patent Number: 5,206,514

[45] Date of Patent: Apr. 27, 1993

[54] LUMINESCENT STORAGE SCREEN HAVING A STIMULABLE PHOSPHOR

[75] Inventors: Gerhard Brandner, Zirndorf; Peter Hoebel, Buckenhof, both of Fed. Rep. of Germany

[73] Assignee: Siemens Aktiengesellschaft, Munich, Fed. Rep. of Germany

[21] Appl. No.: 831,501

[22] Filed: Feb. 5, 1992

[30] Foreign Application Priority Data

Feb. 13, 1991 [EP] European Pat. Off. ........... 91102025

[51] Int. Cl.[5] ........................ G01N 23/04

[52] U.S. Cl. ........................ 250/484.1

[58] Field of Search ........................ 250/484.1, 327.2

[56] References Cited

U.S. PATENT DOCUMENTS

Re. 31,847 3/1985 Luckey ........................ 250/327.2
3,917,950 11/1975 Carlson ........................ 250/483.1
4,511,802 4/1985 Teraoka ........................ 250/484.1 B
4,560,882 12/1985 Barbaric et al. ........................ 250/487.1
4,778,995 10/1988 Kulpinski et al. ........................ 250/368

FOREIGN PATENT DOCUMENTS 0095188 11/1983 European Pat. Off. .
0197511 10/1986 European Pat. Off. .

*Primary Examiner*—Carolyn E. Fields
*Attorney, Agent, or Firm*—Hill, Steadman & Simpson

[57] ABSTRACT

A luminescent storage screen having a stimulable phosphor for the latent storage of x-ray images, of the type wherein the latent image is read-out by excitation of the stimulable phosphor with a read-out beam having a first wavelength, causing radiation of a second wavelength to be emitted, which is acquired by a detector, the storage screen having lateral faces of disposed at an angle with respect to one of the end faces of the storage screen which is less than 90°. The end faces are transparent so that radiation of the second wavelength can exit the screen from the end faces.

8 Claims, 3 Drawing Sheets

LUMINESCENT STORAGE SCREEN HAVING A STIMULABLE PHOSPHOR

BACKGROUND OF THE INVENTION

1. Field of the Invention

The present invention a luminescent storage screen having a stimulable phosphor for the latent storage of x-ray images, of the type wherein the x-ray image is read-out by exciting the phosphor with a read-out radiation beam.

2. Description of the Prior Art and Related Applications

Luminescent storage screens for the latent storage of x-ray images are known in the art which contain a stimulable phosphor, the stored x-ray image being read-out by exciting the phosphor with a read-out radiation beam of a first wavelength, causing radiation of a second wavelength to be emitted by the phosphor, which is acquired by a detector unit, as described, for example, in European Application 0 369 049.

Such luminescent storage screens are used in image pick-up devices as disclosed, for example, in German OS 23 63 995. These types of storage screens function as a radiation-sensitive transducer in x-ray diagnostics installations. When the screen is irradiated with x-rays, electronic holes are generated in the stimulable phosphor in accordance with the intensity of the incident radiation. These holes are stored in energy traps having a higher energy level, so that a latent x-ray image is contained in the luminescent storage screen.

For read-out of the latent image, the entire surface of the luminescent storage screen is caused to luminesce pixel-by-pixel by a separate radiation source which may be, for example, a laser. This source generates stimulating radiation at a first wavelength, which raises the energy level of the holes stored in the traps, so that they can degenerate to lower energy levels, the energy difference being emitted in the form of light quanta. As a result, the stimulable phosphor emits light at a second wavelength dependent on the energy stored in the stimulable phosphor. The light emitted due to the stimulation is detected and made visible, so that the latently stored x-ray image can be visually displayed.

A problem in the read-out of such known storage screens is that the stimulable phosphor is not sufficiently transparent for the laser light. A minimum thickness of the stimulable phosphor is required in order to achieve adequate absorptions of x-ray quanta. In the case of a non-transparent, densely compressed or sintered phosphor, the laser beam is so highly attenuated by the phosphor during read-out that the penetration depth of the laser beam is too small. After a certain depth within the phosphor, the energy of the laser beam is no longer sufficient to boost the holes to the energy level required for the recombination, so that the information stored in the deeper layers of the phosphor cannot be read out.

A luminescent storage screen is disclosed in European Application 0 369 049, corresponding to co-pending U.S. application Ser. No. 653,950 (Brandner et al., filed Feb. 12, 1991) which is a continuation of Ser. No. 419,784 (filed Oct. 11, 1989, now abandoned), wherein a stimulable phosphor is vapor-deposited onto a carrier in a high vacuum and is tempered in a protective gas atmosphere or in the vacuum, or is pressed in a vacuum while being heated. The production of a transparent phosphor is disclosed in European Application 90102431.5, corresponding to co-pending U.S. application Ser. No. 643,506 (Brandner et al., filed Jan. 22, 1991), by re-shaping transparent stimulable phosphor single crystals to the large area required for medical diagnostics by pressing. This results in the production of a transparent panel of stimulable phosphor. The advantage of transparency is that the laser beam used for read-out is not dispersed in the storage medium due to scattering at the grains of the phosphor material. The broadening of dispersal of the read-out beam due to scatter considerably deteriorates the modulation transfer function of the overall system. The broadening or dispersal of the laser beam upon transirradiation of the storage medium is substantially diminished by the use of a transparent stimulable phosphor which is manufactured, for example, by pressing the phosphor powder.

The problem of direct reflection at the boundary surfaces of the stimulable phosphor is present to a far greater degree in the case of transparent phosphors than in the case of non-transparent phosphor layers which have diffuse reflections. This problem is explained in greater detail with reference to FIG. 1. For pixel-by-pixel read-out of the x-ray image, the exciting beam, having a first wavelength, penetrates the luminescent storage screen 1 which, for example, may consist of a carrier and a binding agent applied thereon with the stimulable phosphor, or may consist of a single-crystal stimulable phosphor. In any event, the beam 2 is incident on the stimulable phosphor 3 which, as a result of such excitation, emits rays 4 at a second wavelength with a spherically symmetrical distribution. Radiation is thus emitted at all angles relative to the boundary surface.

Because, however, the refractive index n of the stimulable phosphor is higher in all cases than that of air or a vacuum ($n'-1$), a total reflection occurs starting with a defined incident angle of the luminescent light relative to the boundary surface, as set forth in detail in FIG. 2. As a result, only a portion of the light can emerge from the desired exit face.

Given total reflection, the boundary angle e is generally calculated based on the relationship $e=\arcsin n'/n$. The solid angle at which exit of the beam occurs is $R=2\pi(1\text{-}\cos e)$. For the transparent stimulable phosphor RbBr having a refractive index $n=1.55$, a boundary angle of 40.18° is obtained for the total reflection, with the solid angle than being 1.48225 sr, which constitutes only 11.8% of the full volume $4\pi$. Only 11.8% of the luminescent light thus emerges from the desired exit face. If the face lying opposite to the desired exit face is provided with a coating which functions as a mirror in the wavelength range of the luminescent light, then this portion of the light which would emerge through this face can be reflected to the desired exit face. The portion of the light which is sought can thus be doubled in the ideal case. Nonetheless, even in this ideal case only 23.6% of the total light can be obtained.

When the lateral faces of the luminescent storage screen are disposed perpendicularly relative to the end faces (the end faces being the face through which radiation enters the storage screen, and the face parallel thereto), the same light portion emerges through the lateral faces, because all light rays which were totally reflected at the end face will be incident on the lateral faces at an angle of $90°-e$. This is illustrated by the geometrical conditions illustrated in FIG. 3. A first ray a of the entering rays 4 is incident on a first end face 5 at an angle of $\alpha_1=45°$ and is totally reflected because the angle is larger than the boundary angle e=40.18°. The reflected ray a' is incident on one of the lateral faces 6 at an angle $\alpha_2=\alpha_1=45°$, so that it is also reflected at that face.

If, as in the case of the ray b, the angle is greater than approximately 50°, the ray b is incident on the end face 5 at an angle $\beta_1$ and is totally reflected at that face. The reflected ray is incident on the lateral face at an angle of incidence $\beta_2$, which is less than 40°, so that the ray b' can emerge refracted from the storage luminescent screen 1.

Only for completeness, a ray c is also shown which is incident on the end face 5 at an angle of incidence $\gamma_1=30°<e=40.12°$, which emerges from this end face 5 at a refracting angle $\gamma_2=50.8°$.

As is apparent from these explanations, a portion of the light emitted in the luminescent storage screen 1 cannot emerge from the screen due to total reflections.

SUMMARY OF THE INVENTION

It is an object of the present invention to provide a luminescent storage screen of the type described above wherein a majority of the emitted light can be coupled out of the storage luminescent screen and conducted to a light detector.

The above object is achieved in accordance with the principles of the present invention in a luminescent storage screen wherein the lateral faces of the luminescent storage screen form an angle with one of the end faces which is smaller than 90°. The portion of the emitted radiation which is retained in the luminescent storage screen, upon emergence from the storage medium, due to total reflections is thus reduced.

Preferably the "smaller than 90°" angle is approximately 60°. This results in the luminescent storage screen having a trapezoidal cross section. Preferably the cross section of the stimulable phosphor forms an equilateral trapezoid. The luminescent storage screen can be employed with particular advantage using a stimulable phosphor which is transparent at least in the range of the second (emitted) wavelength.

All of the light of the second wavelength can be completely acquired by attaching obliquely disposed mirrors to the sides of the luminescent storage screen, which direct the light emerging at the lateral faces of the luminescent storage screen in a direction toward the light detector. Totally reflected light can at least partially emerge if the lateral faces of the luminescent storage screen are diffusely mirrored. This can be achieved by a reflector powder, for example $TiO_2$.

A good coupling of the detector to the luminescent storage screen is achieved by applying a medium to the screen which couples the screen to the detector and has a refractive index which is the same as, or higher than, that of the stimulable phosphor. Total reflections are thereby avoided. An optical immersion oil is particularly suited for this purpose.

DESCRIPTION OF THE PREFERRED EMBODIMENTS

Figure 4:
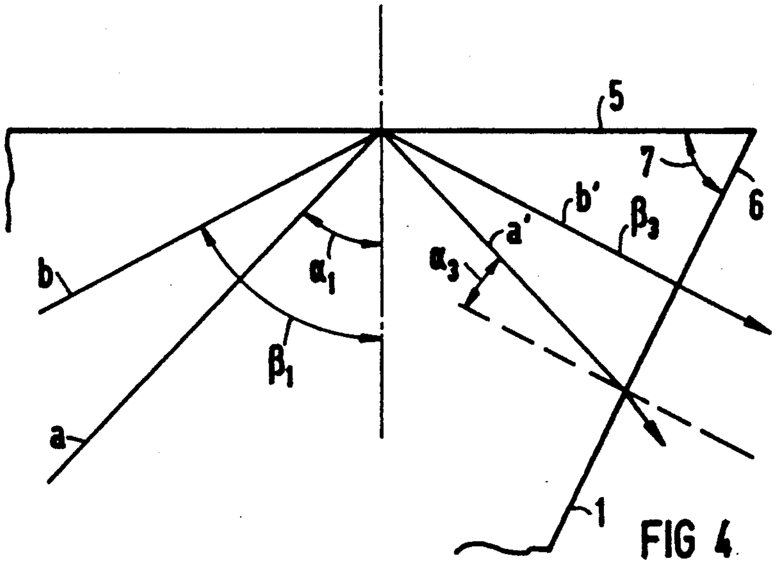
FIGS. 4, 5 and 6 are side schematic views of respective embodiments of a luminescent storage screen constructed in accordance with the principles of the present invention.

A portion of a luminescent storage screen constructed in accordance with the principles of the present invention is shown in FIG. 4, in which a major (end) face 5 and at least one lateral face 6 form an angle 7. This angle can assume any value less than 90°, preferably 10° through 80°. In the example of FIG. 4, an angle 7 of 60° is shown.

Figure 1:
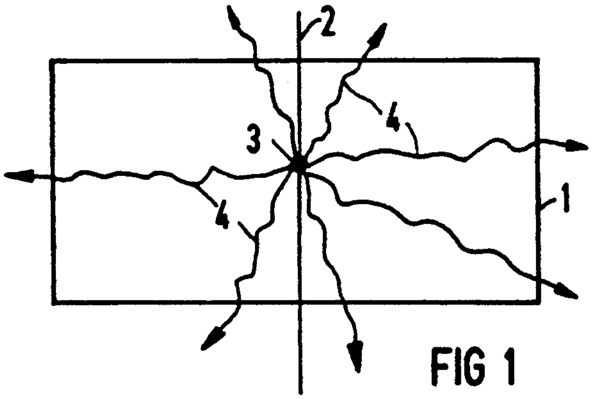
FIG 1 (PRIOR ART)
FIGS. 1, 2 and 3 are schematic illustrations of a conventional luminescent storage screen for explaining the geometrical conditions giving rise to the above-discussed problems in the art.
Figure 2:
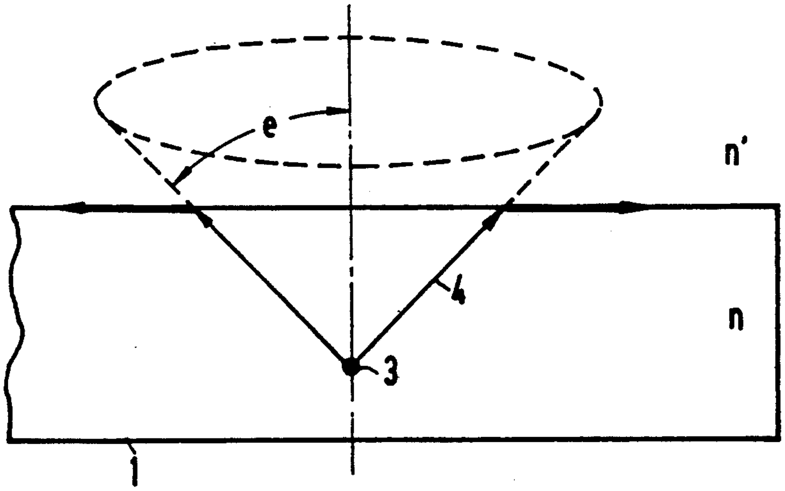
FIG 2 (PRIOR ART)
Figure 3:
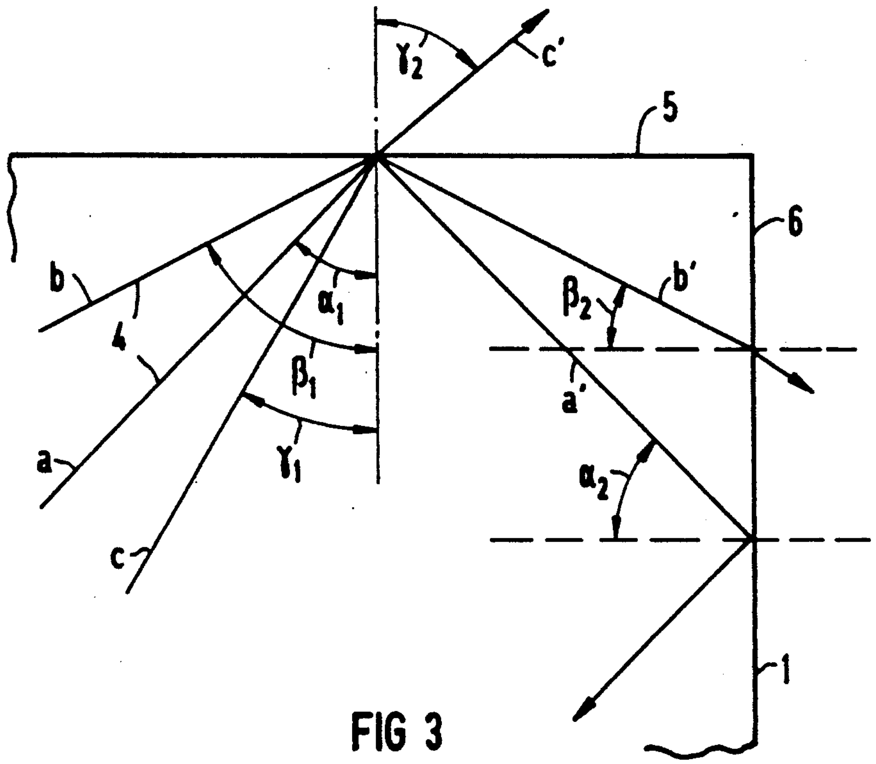
FIG 3 (PRIOR ART)

The same geometric conditions as discussed above in connection with FIG. 3 can be used for explaining the invention. Again, the ray a is incident on the end face 5 at an angle $\alpha_1$, and is totally reflected at that face. The ray a' is then incident on the oblique lateral face 6 at an angle $\alpha_3$ of $45°-30°=15°$, which is smaller than the boundary angle e. The ray a' can now emerge refracted from the luminescent storage screen 1. The ray b, which is incident on the end face at an angle of incidence $\beta_1$ is now incident on the lateral face 7 at an angle $\beta_3=0°$, and thus passes unrefracted.

On the basis of such a luminescent storage screen, the total light reflected at all boundary surfaces of the luminescent storage screen to the external medium (i.e., air) is permitted to emerge at another face, so that the light can be acquired at that face by suitably disposed detectors. To this end, for example, a plurality of detectors can be provided respectively allocated to the individual faces 5 and 6.

An anti-reflection layer, which prevents reflection of the ray 2 at the transition layer, can be applied to the rear of the luminescent storage screen 1, i.e., the side at which the beam 2 emerges from the luminescent storage screen 1. As a result, the beam 2 emerges unimpeded and without reflection. The beam 2 excites the phosphor 3 in the luminescent storage screen 1 pixel-by-pixel and the phosphor 3 emits the rays 4. The detector which receives the emitted light can be arranged at the front side of the luminescent storage screen 1, i.e., at the side at which beam 2 enters the screen 1, or at the rear of the storage luminescent screen 1 for receiving the rays 4. It is also possible to provide two detectors at both sides of the luminescent storage screen 1. A broadband anti-reflection coating can be provided on the front side of the luminescent storage screen 1, so that the exciting beam 2 can be coupled as completely as possible into the luminescent storage screen 1, and the emitted rays 4 can emerge as completely as possible.

Figure 5:
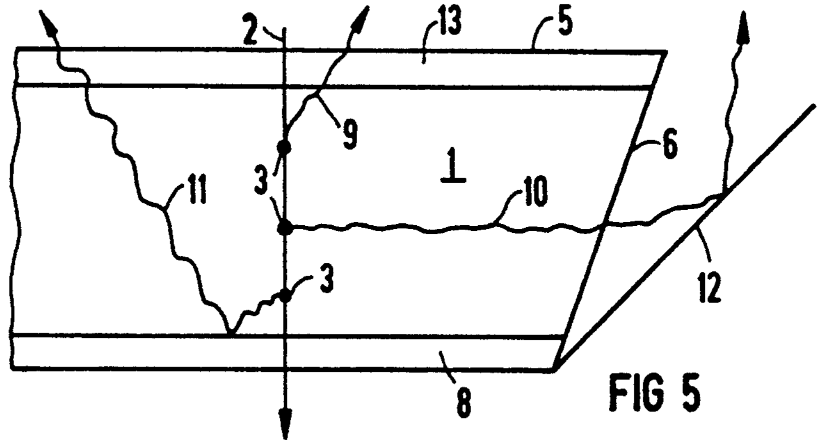

Another embodiment of a luminescent storage screen 1 is shown in FIG. 5, which is read-out in reflection. A wavelength-selective mirror 8 is applied to the rear of the luminescent storage screen 1, the wavelength-selective mirror 8 forming an anti-reflection coating for the beam 2 of the first wavelength, and forming a reflection coating for the beam 11 at the second wavelength. As a result, not only the beams 9 but also the beams 11 proceed to the side at which the detector is disposed. Mirrors 12 are laterally secured to the end face to which the wavelength-selective mirror 8 is attached, the mirrors 12 reflecting beams 10 which emerge from the lateral faces 6 in a direction toward the detector, so that only one detector is needed in order to acquire all the emitted beams 9, 10 and 11. In this embodiment as well, the luminescent storage screen 1 can be provided with an anti-reflection coating 13.

Figure 6:
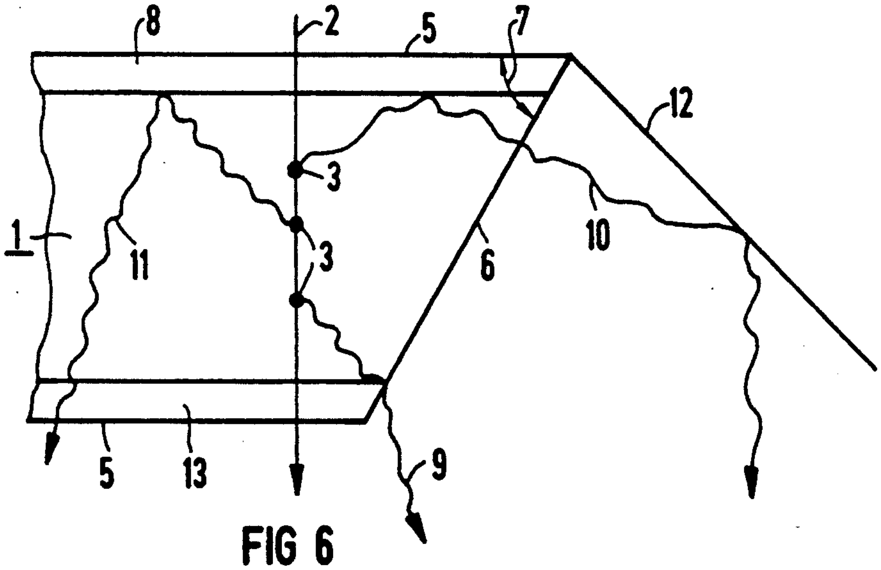

Another embodiment of the luminescent storage screen constructed in accordance with the principles of the present invention is shown in FIG. 6, wherein read-out takes place in transmission, i.e., at the rear of the luminescent storage screen 1. In this embodiment, the luminescent storage screen 1 is provided with a wavelength-selective mirror 8 at the entry side for the beam 2, the wavelength-selective mirror 8 acting as an anti-reflection coating for the beam 2, and as a reflection coat for the emitted beams 11. The rear end face 5 of the luminescent storage screen 1 is provided with an anti-reflection coating 13, so that both the beam 2 and the beams 9 and 11 emerge unreflected from the luminescent storage screen 1 and can be completely acquired by the detector.

Again, mirrors are laterally attached to the end face 5 of the luminescent storage screen 1 to which the wavelength-selective mirror 8 is attached, these mirrors 12 conducting the beams 10 emerging from the lateral faces 6 in the direction of the detector, so that all of the beams 9, 10 and 11 can be acquired by a single detector.

Figure 7:
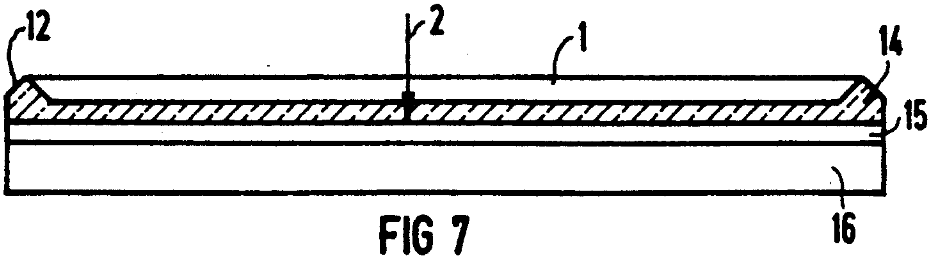
FIG. 7 is a side view of a luminescent storage screen constructed in accordance with the principles of the present invention coupled to a detector.

For better coupling of the light detector to the luminescent storage screen 1, the screen 1 can be coated, as shown in FIG. 7, with a layer 14 consisting of a medium which is in direct contact with the detector. In the embodiment of FIG. 7, the detector is a planar detector 16 having a filter 15, or alternatively a light-guide in place of or in addition to the filter 15. As can also be seen in FIG. 7, the luminescent storage screen 1 may have the structure shown in FIG. 6. As shown in FIG. 7, the space between the lateral faces 6 of the luminescent storage screen 1 and the laterally-disposed mirrors 12 can also be filled with the layer 14. The medium forming, or contained in, the layer 14 must have a high optical transmission in the wavelength range of the beams of the second wavelength and must have a refractive index which is the same as, or higher than the stimulable phosphor. Suitable materials for the medium in the layer 14 are, for example, optical immersion oils of the type employed in optical (light) microscopes. This results in absolutely no total reflection occurring at the exit face of the screen to the detector.

Instead of the planar detector 16 shown in FIG. 7, the detector may be a planar light conductor, to which at least one line-detector is attached. The detector may alternatively consist only of a line or strip detector, if means are provided for moving the luminescent storage screen 1 over this line-detector for planar scanning.

A transparent panel of rubidium bromide (RbBr) doped with thallium bromide (TiBr) in a ratio of 0.01 through 1 mol % may, for example, be used as the stimulable phosphor in the luminescent storage screen 1 constructed in accordance with the principles of the present invention. The read-out of the stored information can be undertaken with a beam 2 of a HeNe laser having a wavelength 633 nm. The emitted beams 9, 10 and 11 will then have a wavelength from 400 through 420 nm. The laser beam 2 may be focused, for example, to a width of 50 μm. The detector and the laser can be situated at the same side of the luminescent storage screen 1, so that read-out ensues in reflection. The other side of the luminescent storage screen 1 is vapor-deposited with a wavelength-selective mirror 8 in a high vacuum, the mirror 8 having a high transmission for electromagnetic radiation of the wavelength 633 nm (for example, greater than 99%) and simultaneously having a high reflection for a wavelength range from 400 through 420 nm (for example, greater than 90%). For example, such a beam splitter can consist of a multilayer system of cryolite $Na_3AIF_6$ and ZnS. The number and grid structure of the layers can be optimized to the wavelength of the electromagnetic radiation which is to be separated.

As a result, a luminescent storage screen 1 is obtained, in accordance with the principles of the present invention, which results in all light rays emitted by the stimulable phosphor proceeding to the boundary surface and being coupled out of the luminescent storage screen 1, so that the light is either acquired by a plurality of detectors, or is conducted to one detector by the mirrors 12. As a result of using a transparent stimulable phosphor, the luminescent storage screen 1 has a high x-ray quantum absorption resulting in high imaging sharpness, and a good modulation transfer function. Disturbing influences caused by reflections are avoided by using the surface-coating layers 8 and 13.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a system for storing and reading-out x-ray images having a luminescent storage screen containing a stimulable phosphor in which an x-ray image is latently stored, said stimulable phosphor emitting radiation at a second wavelength when excited by radiation of a first wavelength, the improvement comprising said luminescent storage screen having end faces, said stimulation radiation entering said luminescent storage screen through one of said end faces, and lateral faces joining said end faces, with the entirety of said lateral faces being disposed at an angle relative to said one of said end faces which is less than 90°, said end faces being transparent to said radiation of said second wavelength for permitting said radiation of said second wavelength to exit said luminescent storage screen.

2. The improvement of claim 1 wherein said angle is approximately 60°.

3. The improvement of claim 1 wherein said lateral faces and said end faces are disposed so that said luminescent storage screen has a trapezoidal cross section.

4. The improvement of claim 3 wherein said lateral faces and said end faces are disposed so that said luminescent storage screen has an equilateral trapezoidal cross section.

5. The improvement of claim 1 wherein said stimulable phosphor is a stimulable phosphor which is transparent at least in the range of said second wavelength.

6. The improvement of claim 1 further comprising obliquely disposed mirrors disposed at said lateral faces of said luminescent storage screen for directing light emitted by said stimulable phosphor and emerging at said lateral faces.

7. The improvement of claim 1 wherein for use with a detector, one of said end faces of said luminescent storage screen faces said detector, and further comprising a layer disposed on said end face facing said detector consisting of a medium for optically coupling said luminescent storage screen to said detector, said medium having a refractive index which is the same as or higher than the reflective index of said stimulable phosphor.

8. The improvement of claim 7 wherein said medium is an optical immersion oil.

* * * * *